Figure 1:
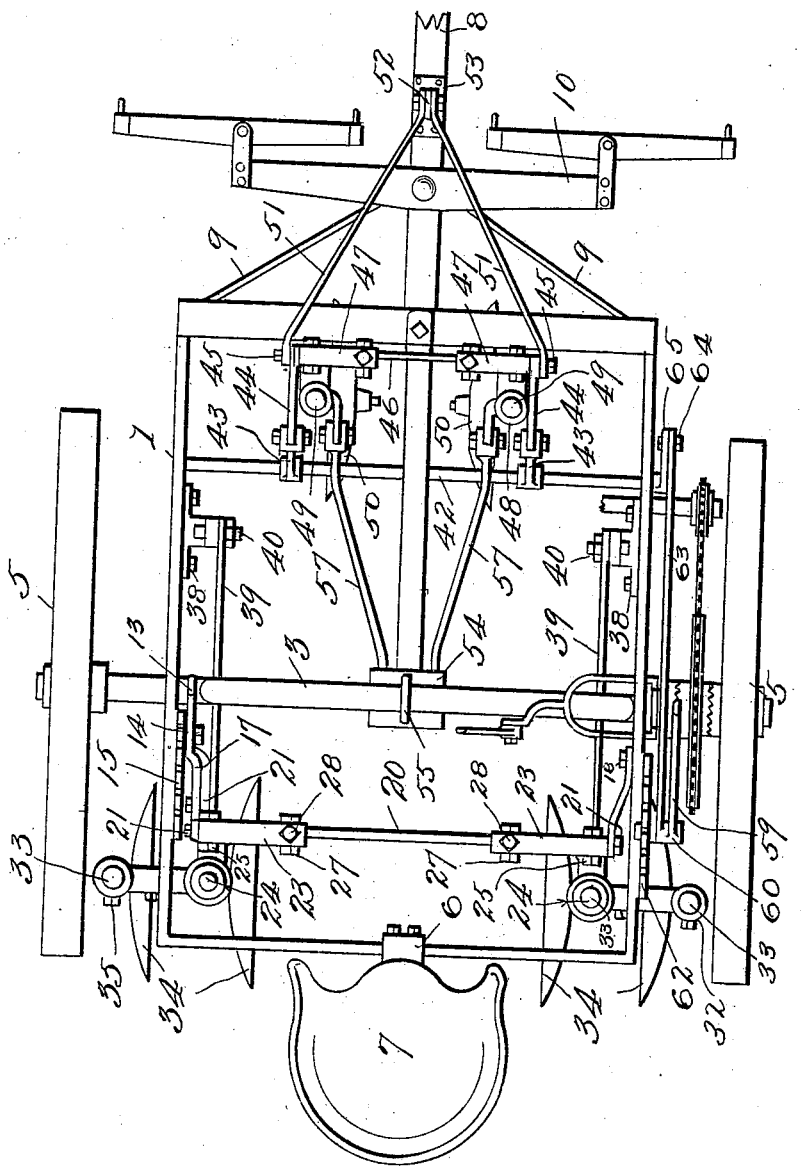

No. 886,207. PATENTED APR. 28, 1908.
E. B. HACKBURN, W. C. WILLETT & D. F. DEPPE.
FERTILIZER DISTRIBUTER.
APPLICATION FILED JAN. 4, 1907.

3 SHEETS—SHEET 1.

Witnesses
Chas N. Davies.
John S. Powars

Inventors
Ephraim B. Hackburn
William C. Willett
Dennis F. Deppe
By Shepherd Parker
Attorneys No. 886,207. PATENTED APR. 28, 1908.
E. B. HACKBURN, W. C. WILLETT & D. F. DEPPE.
FERTILIZER DISTRIBUTER.
APPLICATION FILED JAN. 4, 1907.
3 SHEETS—SHEET 2.
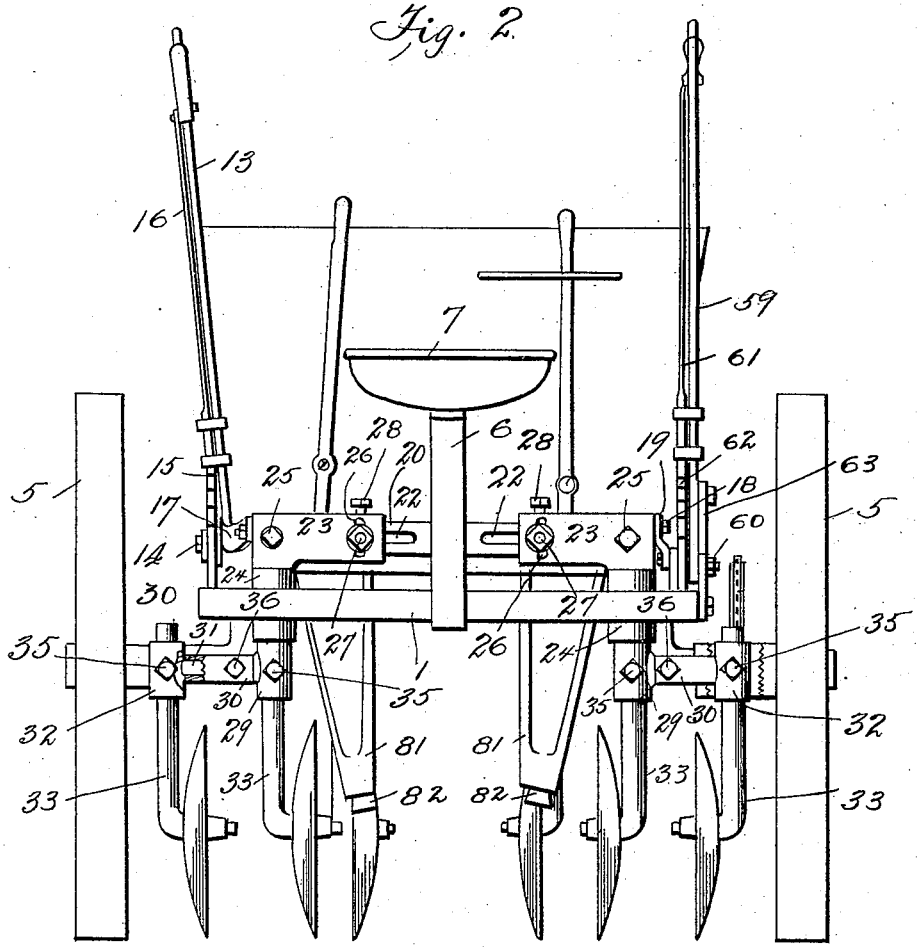
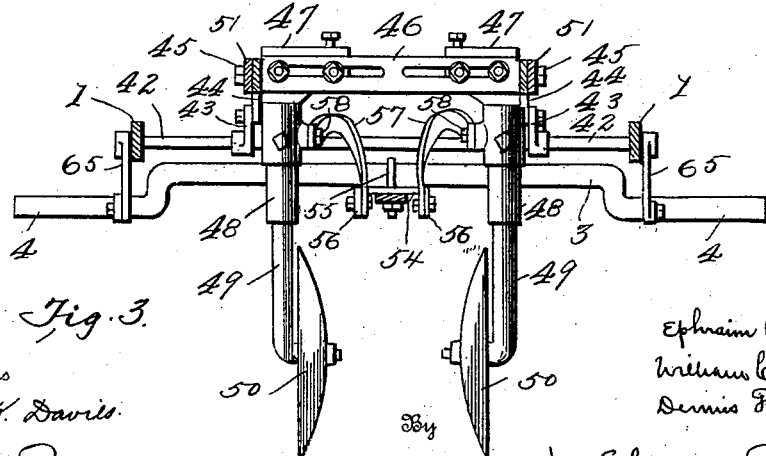

No. 886,207. PATENTED APR. 28, 1908.
E. B. HACKBURN, W. C. WILLETT & D. F. DEPPE.
FERTILIZER DISTRIBUTER.
APPLICATION FILED JAN. 4, 1907.
3 SHEETS—SHEET 3.
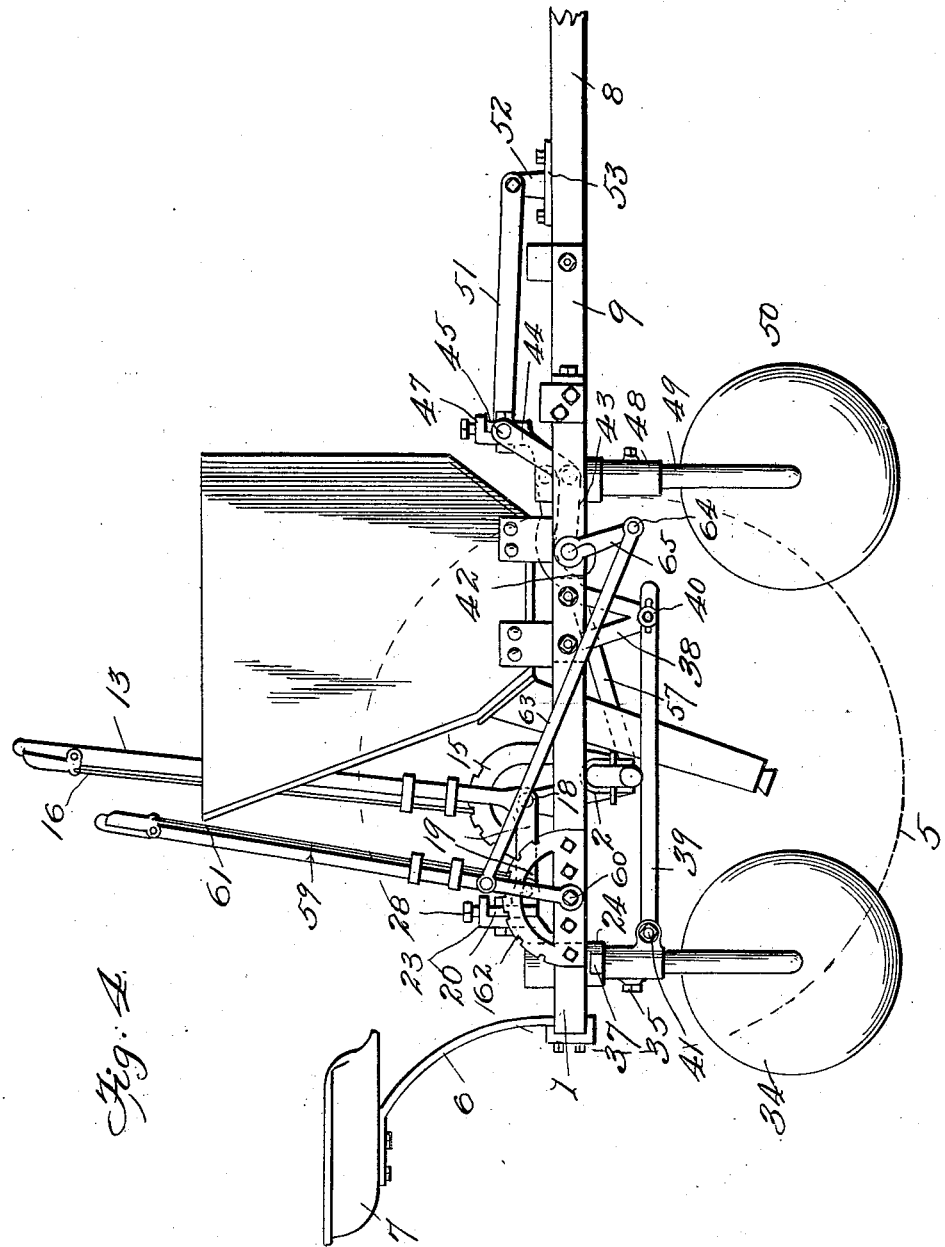
Witnesses
Chas K Davis.
John B Powers
Inventors
Ephraim B Hackburn
William C Willett
Dennis F Deppe
By Shepherd Parker
Attorneys

UNITED STATES PATENT OFFICE.

EPHRAIM B. HACKBURN, WILLIAM C. WILLETT, AND DENNIS F. DEPPE, OF NEWBERN, NORTH CAROLINA.

FERTILIZER-DISTRIBUTER.

No. 886,207.  Specification of Letters Patent.  Patented April 28, 1908.

Application filed January 4, 1907. Serial No. 350,836.

*To all whom it may concern:*

Be it known that we, EPHRAIM B. HACKBURN, WILLIAM C. WILLETT, and DENNIS F. DEPPE, citizens of the United States, residing at Newbern, in the county of Craven and State of North Carolina, have invented certain new and useful Improvements in Fertilizer-Distributers, of which the following is a specification.
This invention relates to new and useful improvements in fertilizer distributers and it particularly pertains to a wheeled device having novelly adjustable soil working elements.

In connection with a device of this character the invention specifically resides in the provision of wheels, or other devices for exposing and covering the soil, and it has for its primary object the provision of novel means for adjusting said wheels to any selected vertical, lateral or angular disposition.

The detailed construction will appear in the course of the following description in which reference is had to the accompanying drawings forming a part of this specification, like characters of reference designating similar parts, throughout the several views, wherein, Figure 1 is a top plan view of a fertilizer distributer constructed in accordance with our invention. Fig. 2 is a rear elevation thereof, Fig. 3 is a front elevation with parts removed to more clearly illustrate the details of construction to be hereinafter specifically referred to, and Fig. 4 is a side elevation thereof.

In the practical embodiment of our invention we employ a substantially rectangular supporting frame 1, upon which the appurtenant elements of the distributing mechanism are mounted. The frame 1 is provided on each side thereof with depending brackets 2 between which is supported a U shaped axle 3 having off-set ends 4 which serve as stub axles and carry the traction wheels 5.
On the rear cross bar of the frame is secured a post 6 carrying the driver's seat 7 and fixed to the front cross bar and to the axle 3 is the tongue 8 which is strengthened by braces 9 interposed between the same and said cross bar of the frame 1 and which carries the double trees 10. This construction is clearly shown in Fig. 1.

On the left hand side of the apparatus as illustrated, a lever 13 is pivoted as at 14 to a notched quadrant 15. The latter is carried by the frame 1 and is engaged by a manually operated sliding pawl 16 of conventional form provided upon said lever. The lever 13 at its lower end adjacent its pivot 14 has an angularly extending arm 17. On the opposite side of the frame 1 there is pivoted as at 18 an arm 19. The arms 17 and 19 are co-extensive and coincident in their disposition and conjointly support a cross bar 20. To this end said arms, at their extremities are pivoted as at 21 to rearward extensions or lugs provided upon the ends of said cross bar. The cross bar 20 constitutes a positive support for the rear disks which serve to cover the ground. Said cross bar is provided on each side thereof with longitudinal slots 22 and the ends of said cross bar are loosely projected through the horizontal portions of conformable hollow brackets 23. The brackets 23 on each side of the frame have depending extensions 24 within which are received the disk hangers or standards to be hereinafter described. The brackets 23 are adjustable laterally and angularly with relation to the cross bar 20. Adjacent the extensions 24, said brackets carry bolts 25 which project through the slots 22 and afford a pivot joint which permits of an angular adjustment of said brackets. Adjacent their ends, each of said brackets has a curved vertical slot 26, through which is received a bolt and nut fastening 27, the said bolt and nut fastening likewise passing through the adjacent slot 22.

For the purpose of effecting the angular adjustment of the brackets 23, there is threaded through the upper portions of said brackets a screw 28 which bears against the upper edge of the cross bar 20. Rotation of the screw 28 in either direction moves the bracket 23, correspondingly on its pivot 25. It will be apparent that when a lateral adjustment is desired the bolt and nut fastenings 25 and 27 are loosened to permit the brackets 23 being slid in either direction upon the cross bar 20, and when said brackets have been set in any selected position the bolt and nut fastenings 25 and 27 are tightened to lock them in such position.

It is preferred that the rear disks be arranged in opposed pairs on each side of the frame 1. To this end we employ a novel embodiment of hanger which comprises interfitting members adjustably connected. Within the extensions 24 of the bracket 23 there is received the vertical tubular portion 29 of a disk hanger. Said portion 29 carries an integral horizontal sleeve 30 within which is telescopically received a horizontal extension 31 of the vertical tubular member 32. The members 29 and 32 thus conjointly constitute hangers for the rear disks and have received therethrough the standards 33, by which the rear disks 34 are carried. It will be apparent that this manner of assembling the hangers permits of every possible adjustment. The standards 33 are adjustable, both angularly and vertically with relation to the members 32 and are held in any desired adjustment by a set screw 35 passing through said members and bearing against said standards. The member 32 is adjustable with relation to the member 29 by means of the interfitting extensions 31 and 30 and said member 32 is held in any desired position with relation to the member 29, by a set screw 36 threaded through the extension 30 and bearing against the extension 31. The hanger as an entirety is adjustable vertically and angularly in the extension 24 and is held at any desired adjustment by a set screw 37 threaded through said extension and engaging said member 29. The frame 1 carries on each side thereof depending V shaped brackets 38. Between the brackets 38 and the members 29, a reinforcing link 39 is interposed. The link 39 is adjustably pivoted by a conventional bolt and slot joint 40 to the adjacent bracket 38 and is pivoted as at 41 to an ear provided upon said members 29.

A rock shaft 42 is journaled in the frame 1 adjacent its forward end and is provided with spaced parallel arms 43. To the ends of the arms 43, links 44 are pivoted, said links having pivotal connection at their outer ends as at 45 with a cross bar 46, the construction and function of which is similar to that of the cross bar 20. Mounted upon the bar 46 are adjustable brackets 47, similar in construction and arrangement to the brackets 23 and carrying telescopically therewithin hangers 48 within which are adjustably received the standards 49 which carry the front disks 50. For the purpose of steadying said cross bar 46, we have provided angularly arranged links 51 pivoted to the cross bar at the above mentioned pivot joint 45 and pivoted at their outer ends to an upstanding ear 52 provided upon a plate 53 carried by the tongue 8. The shaft 3 carries centrally thereof a plate 54 which is held thereupon by the tongue clip 55. The plate 54 has depending side portions 56 to which are pivotally connected the ends of link braces 57, the front ends of which are pivoted as at 58 to ears provided on the hangers 47. It is preferred that the front disks be arranged singly on each side of the frame as is shown in Fig. 3. Through the connections described the front disks have the same adjustment as the rear disks. The cross bar 46 is raised or lowered in accordance with the rotation of the shaft 42 and the latter is rotated by a lever 59, provided at the rear portion of the frame 1 and as shown on the right hand side thereof.

The lever 59 is pivoted to the frame 1 as at 60 and carries a manually controlled sliding pawl 61 designed to engage a notched quadrant 62 of which the pivot 60 is the center. The lever 59 adjacent its lower end, has pivotal connection with a link 63 and the latter is in turn pivoted as at 64 to a depending arm 65 carried rigidly by the shaft 42. By reason of these connections, it will be apparent that by swinging the lever 59 in either direction the shaft 42 will be correspondingly rocked to raise or lower cross bar 46 and the elements supported thereby.

From the foregoing description the detailed uses of the various elements will be readily apparent. With regard to the general use the apparatus can be used as a harrow with either or both series of front and rear disks. It may be used in connection with a fertilizer distributer or a seeder as is shown. When the disks are not used the levers 13 and 59 controlling each series thereof, are moved in the proper direction to raise the cross bars and thus lift the disks carried thereby out of the ground.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described our invention, we claim:

1. In a device of the character described, the combination of a frame, forward and rear cross bars adjustably held therein, brackets carried by said cross bars and adjustable longitudinally and angularly thereof, soil working devices having supporting standards, tubular standard supporting members adapted to receive said standards adjustably therein, and means carried by said brackets for adjustably holding said supporting members therein.

2. In a device of the character described, the combination of a frame, a slotted cross bar carried thereby, brackets adjustably secured through said slots and having depending tubular portions, soil working devices having supporting standards, tubular supporting members adapted to receive said standards adjustably therein, said tubular supporting members being in turn adjustably secured within said depending tubular portions of said brackets.

3. In a device of the character described, the combination of a frame, a slotted cross bar carried thereby, brackets adjustably secured through said slots and having depending tubular portions, soil working devices having supporting standards, tubular supporting members adjustably carried within said depending tubular portions of said brackets and having angular tubular extensions and similarly constructed tubular members having angular extensions telescopingly adjustably carried within said angular extensions of said first named members, both of said members being adapted to receive one of said supporting standards adjustably therein.

4. In a device of the character described, the combination of a wheeled frame, slotted cross bars carried forwardly and rearwardly therein, brackets mounted longitudinally adjustably within said slots and having means to permit of the angular adjustment thereof, said brackets having depending tubular portions, soil working devices having supporting standards and tubular supporting members adjustably carried within said tubular portions of said brackets, said tubular members being adapted to receive said standards adjustably therein.

5. In a device of the character described, the combination of a wheeled frame, slotted cross bars carried forwardly and rearwardly therein, brackets mounted longitudinally adjustably within said slots and having means to permit of the angular adjustment thereof, said brackets having depending tubular portions, soil working devices having supporting standards, tubular supporting members adjustably carried within said depending tubular portions of said brackets and having angular tubular extensions, and similarly constructed tubular members having angular extensions telescopingly adjustably carried with said angular extensions of said first named members, both of said members being adapted to receive one of said supporting standards adjustably therein.

In testimony whereof we affix our signatures in presence of two witnesses.

EPHRAIM B. HACKBURN.
WILLIAM C. WILLETT.
DENNIS F. DEPPE.

Witnesses:
O. H. GUION,
WILLIAM DANN, Jr.